Figures 1, 2:
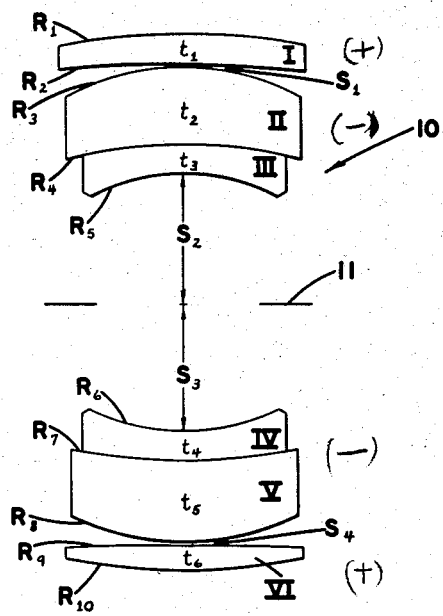

Aug. 18, 1964     M. J. BUZAWA     3,145,255

PROJECTION OBJECTIVE FOR PHOTO MECHANISMS

Filed April 26, 1962

| E.F.L.= 229.3 | | f/4.5 AT INFIN. | F.F.=154.6 | B.F.=173.5 | |
|---|---|---|---|---|---|
| LENS | RADIUS | THICKNESS | SPACES | $n_D$ | $\nu$ |
| I | $R_1 = 118.03$ | $t_1 = 5.50$ | $S_1 = 1.00$ | 1.517 | 64.5 |
|  | $R_2 = 428.55$ | | | | |
| II | $R_3 = 48.753$ | $t_2 = 15.09$ | $S_2 = 24.50$ | 1.517 | 64.5 |
|  | $R_4 = 92.897$ | | | | |
| III | $R_5 = 39.084$ | $t_3 = 5.81$ | | 1.573 | 42.5 |
| IV | $R_6 = -42.073$ | $t_4 = 5.81$ | $S_3 = 24.50$ | 1.573 | 42.5 |
|  | $R_7 = -139.32$ | | | | |
| V | $R_8 = -50.798$ | $t_5 = 16.02$ | | 1.517 | 64.5 |
| VI | $R_9 = 731.14$ | $t_6 = 5.00$ | $S_4 = 0.25$ | 1.517 | 64.5 |
|  | $R_{10} = -161.44$ | | | | |

*INVENTOR.*
MICHAEL J. BUZAWA

BY *Frank C. Parker*

*ATTORNEY*

3,145,255
PROJECTION OBJECTIVE FOR PHOTO MECHANISMS

Michael J. Buzawa, Rochester, N.Y., assignor to Bausch & Lomb Incorporated, Rochester, N.Y., a corporation of New York
Filed Apr. 26, 1962, Ser. No. 190,369
5 Claims. (Cl. 88—57)

This invention relates to a projection objective and more particularly it relates to an improved Gauss type of optical system therefor which is nearly symmetrical in form and is used with certain specified wavelength bands of light involving only low magnification of the object.

Optical systems of the above-mentioned type are particularly adapted for use in photomechanisms such as spot scanners etc., in which the system is required to image sharply a mosaic of tiny spots composed of fluorescent phosphors which radiate energy in a relatively narrow wave band.

It is an object of this invention to provide a novel Gauss type of projection optical system having a field angle of about 8°, a relative aperture for infinity of $f/4.5$, and working at low magnification of about 2.5×, said system being well corrected chromatically in the transmission of radiant energy from phophors in the 370 mu and 460 mu wavelength bands.

A further object is to provide such a device in which all monochromatic aberrations as well as coma, distortion and flatness of field are equal to high grade objectives and in which the performance is essentially diffraction-limited.

Further objects and advantages will be apparent in the details of construction and in the particular optical properties incorporated therein by reference to the specification herebelow taken together with the accompanying drawing, in which:

FIG. 1 is an optical diagram showing a preferred form of the present invention; and FIG. 2 is a chart showing the constructional data for one form of said invention.

Generally shown at 10 in the drawing is an optical system for a projection objective constructed according to the present invention wherein is comprised a front meniscus lens member I which is convex toward the front, and is optically aligned with and spaced from a rear double convex lens member VI. Optically aligned therebetween is a nearly symmetrical pair of meniscus compound lens members which are symmetrically spaced about a central diaphragm 11 and are composed of two positive outer convex-concavo meniscus lens elements numbered II and V, respectively, which have their concave surfaces in contact with inner negative convex-concavo lens elements III and IV, respectively.

In all forms of this invention, the optical system 10 is constructed so as to form a sharp and well-corrected image in which color correction is optimized for the selected wavelength band, said color correction being secured along with an essentially diffraction-limited monochromatic performance and a flat field. Said optical system 10 embodying the characteristics above described may be constructed by the use of the ranges of constructional data given in the table of mathematical expressions herebelow wherein the radii of the successive lens surfaces are designated $R_1$ to $R_{10}$ which are related respectively to lens parts I to VI as aforesaid, the axial thicknesses of the lens parts I to VI being designated $t_1$ to $t_6$, the spaces between said lens parts being successively designated $S_1$ to $S_4$ numbering all subscripts from the front, the (—) minus sign for the values of radii designating surfaces which are convex toward the front or entrance side of the system, and wherein $n_D$ and $\nu$ designate respectively the refractive index and Abbe number of the lens materials, and F represents the equivalent focal length of said system:

(Element I)  $.244 < \dfrac{R_1}{R_2} < .300$ (Element II)
(Element III)  $1.12 < \dfrac{R_3}{R_5} < 1.35$ (Element IV)
(Element V)  $1.09 < \dfrac{R_8}{R_6} < 1.33$ (Element VI)  $.206 < \dfrac{R_{10}}{R_9} < .235$ $.65 < \dfrac{R_4}{R_7} < .70$ $.0218F < t_1 < .0262F$
$.0566F < t_2 < .0740F$
$.0219F < t_3 < .0305F$
$.0219F < t_4 < .0305F$
$.0610F < t_5 < .0740F$
$.0196F < t_6 < .0250F$
$.00394F < S_1 < .00437F$
$.0875F < S_2 < .1137F$
Diaphragm
$.0875F < S_3 < .1137F$
$.000745F < S_4 < .0018F$ Furthermore, the refractive index value of the lens materials in lens members I and VI and of the positive lens elements II and V is exceeded more than .050 by the refractive index value of the negative lens elements III and IV. Correspondingly, the lens members I and VI as well as the lens elements II and V have an Abbe number which exceeds by more than 20.0 the Abbe number of lens elements III and IV.

The individual values of the lens surface radii $R_1$ to $R_{10}$ are specified by the following table of ranges of values thereof, the (—) minus sign denoting those surfaces which are convex toward entrant rays:

$.48F < R_1 < .50F$
$1.75F < R_2 < 1.97F$
$.19F < R_3 < .22F$
$.37F < R_4 < .44F$ (Interface)
$.16F < R_5 < .18F$
$.17F < -R_6 < .19F$
$.59F < -R_7 < .63F$ (Interface)
$.21F < -R_8 < .23F$
$R_9 > \pm 3.0F$
$.61F < -R_{10} < .79F$ The ranges of values for refractive index $n_D$ and Abbe number $\nu$ are specified by the mathematical expressions given in the table herebelow:

$1.515 < n_D$ (I) $< 1.521$     $62.0 < \nu$ (I) $< 68.0$
$1.515 < n_D$ (II) $< 1.521$    $62.0 < \nu$ (II) $< 68.0$
$1.570 < n_D$ (III) $< 1.585$   $40.0 < \nu$ (III) $< 50.0$
$1.570 < n_D$ (IV) $< 1.585$    $40.0 < \nu$ (IV) $< 50.0$
$1.515 < n_D$ (V) $< 1.521$     $62.0 < \nu$ (V) $< 68.0$
$1.515 < n_D$ (VI) $< 1.521$    $62.0 < \nu$ (VI) $< 68.0$

In one form of the present invention, the optical system 10 is particularly computed and designed to use the energy radiation of certain phosphors which radiate in the 370 mu wavelength band and the parameters of such a system are specified in the table herebelow:

$R_1 = .497F$
$R_2 = 1.773F$
$R_3 = .204F$
$R_4 = .414F$
$R_5 = .167F$
$R_6 = -.1785F$
$R_7 = -.609F$
$R_8 = -.2135F$
$R_9 = 4.140F$
$R_{10} = -.657F$
$t_1 = .0254F$
$t_2 = .0595F$
$t_3 = .0254F$
$t_4 = .0254F$
$t_5 = .0631F$
$t_6 = .0233F$
$S_1 = .00424F$
$S_2 = .1063F$
Diaphragm
$S_3 = .1063F$
$S_4 = .000833F$
$n_D$ (I) $= n_D$ (II) $= n_D$ (V) $= n_D$ (VI) $= 1.517$
$n_D$ (III) $= n_D$ (IV) $= 1.583$
$\nu$ (I) $= \nu$ (II) $= \nu$ (V) $= \nu$ (VI) $= 64.2$
$\nu$ (III) $= \nu$ (IV) $= 46.5$ The symbolism hereabove has the same meaning as in the preceding tables. In order to further restrict the passage of rays to the selected wavelength band of 370 mu, all of the air-glass surfaces of the optical system 10 are coated with an anti-reflection coat having maximum transmission at the named wavelength.

In another form of the present invention, the optical system 10 is particularly computed and designed to use the energy radiation of certain phosphors which radiate in the 460 mu wavelength band and the parameters of such a system are specified in the tables herebelow:

$R_1 = .515F$
$R_2 = 1.872F$
$R_3 = .2125F$
$R_4 = .405F$
$R_5 = .171F$
$R_6 = -.1837F$
$R_7 = -.608F$
$R_8 = -.221F$
$R_9 = 3.190F$
$R_{10} = -.704F$
$t_1 = .02395F$
$t_2 = .06580F$
$t_3 = .02535F$
$t_4 = .02535F$
$t_5 = .0700F$
$t_6 = .0218F$
$S_1 = .00436F$
$S_2 = .1067F$
Diaphragm
$S_3 = .1067F$
$S_4 = .00109F$
$n_D$ (I) $= n_D$ (II) $= n_D$ (V) $= n_D$ (VI) $= 1.517$
$n_D$ (III) $= n_D$ (IV) $= 1.573$
$\nu$ (I) $= \nu$ (II) $= \nu$ (V) $= \nu$ (VI) $= 64.5$
$\nu$ (III) $= \nu$ (IV) $= 42.5$ In order to further restrict the passage of rays to the selected wavelength band of 460 mu, all of the air-glass surfaces of the optical system 10 in this form of the invention are coated with an anti-reflection coat having a maximum transmission at the above-named wavelength.

Stated in another manner, the last-described form of the invention is described in the chart of numerical values herebelow:

[E.F.L. = 229.3.  f/4.5 at infin.  F.F. = 154.6.  B.F. = 173.5]

| Lens | Radius | Thickness | Spaces | $n_D$ | $\nu$ |
|---|---|---|---|---|---|
| I | $R_1 = 118.03$ | $t_1 = 5.50$ | | 1.517 | 64.5 |
| | $R_2 = 428.55$ | | $S_1 = 1.00$ | | |
| II | $R_3 = 48.753$ | $t_2 = 15.09$ | | 1.517 | 64.5 |
| III | $R_4 = 92.897$ | $t_3 = 5.81$ | | 1.573 | 42.5 |
| | $R_5 = 39.084$ | | $S_2 = 24.50$ Diaphragm $S_3 = 24.50$ | | |
| IV | $R_6 = -42.073$ | $t_4 = 5.81$ | | 1.573 | 42.5 |
| V | $R_7 = -139.32$ | $t_5 = 16.02$ | | 1.517 | 64.5 |
| | $R_8 = -50.798$ | | $S_4 = 0.25$ | | |
| VI | $R_9 = 731.14$ | $t_6 = 5.00$ | | 1.517 | 64.5 |
| | $R_{10} = -161.44$ | | | | |

Although only certain definite forms of the present invention have been shown and described in detail, other forms are possible and changes may be made in the details of structure thereof without departing from the spirit of the invention as defined in the appended claims.

I claim:

1. An optical system of the Gauss type for a projection objective working at low magnification, said system having a relative aperture as large as f/4.5 for infinity and being well corrected for color aberration for the transmission of radiant energy in the wavelength range from 3400 A. to 4400 A. as well as being diffraction limited in performance, said system consisting of a front singlet meniscus lens member, a singlet double convex member most rearwardly, and a pair of substantially symmetrical compound convex-concavo lens members optically aligned between said front and rear members, the concave surfaces of the compund members enclosing a diaphragm centrally therebetween, the compound members each having a positive meniscus lens element and a negative meniscus lens element in contact therewith and nearest to said diaphragm, the radii $R_1$ to $R_{10}$ of the successive lens surfaces on the lens elements I to VI, the successive lens thicknesses $t_1$ to $t_6$, the lens spacings $S_1$ to $S_4$ and the refractive indices $n_D$ and Abbe numbers $\nu$ having values substantially as given in the table herebelow;

$R_1 = .497F$
$R_2 = 1.773F$
$R_3 = .204F$
$R_4 = .414F$
$R_5 = .167F$
$R_6 = -.1785F$
$R_7 = -.609F$
$R_8 = -.2135F$
$R_9 = 4.140F$
$R_{10} = -.657F$
$t_1 = .0254F$
$t_2 = .0595F$
$t_3 = .0254F$
$t_4 = .0245F$
$t_5 = .0631F$
$t_6 = .0233F$ $S_1 = .00424F$
$S_2 = .1063F$
Diaphragm
$s_3 = .1063F$
$s_4 = .000833F$
$n_D (I) = n_D (II) = n_D (V) = n_D (VI) = 1.517$
$n_D (III) = n_D (IV) = 1.583$
$\nu (I) = \nu (II) = \nu (V) = \nu (VI) = 64.2$
$\nu (III) = \nu (IV) = 46.5$ 2. An optical system according to claim 1 further characterized by an anti-reflectance coat formed on all of the air-glass surfaces thereof, said coat having maximum light transmission at a wavelength of substantially 370 millimicrons.

3. An optical system of the Gauss type for a projection objective working at low magnification, said system having a relative aperture as large as $f/4.5$ for infinity and being well corrected for color aberration for the transmission of radiant energy in the wavelength range from 3400 A. to 4400 A. as well as being diffraction limited in performance, said system consisting of a front singlet meniscus lens member, a singlet double convex member most rearwardly, and a pair of substantially symmetrical compound convex-concavo lens members, the concave surfaces of the compound members enclosing a diaphragm centrally therebetween, the compound members each having a positive meniscus lens element and a negative meniscus lens element in contact therewith and nearest to said diaphragm, the radii $R_1$ to $R_{10}$ of the successive lens surfaces on the lens elements I to VI, the successive lens thicknesses $t_1$ to $t_6$, the lens spacings $S_1$ to $S_4$ and the refractive indices $n_D$ and Abbe numbers $\nu$ having values substantially as given in the table herebelow;

$R_1 = .515F$
$R_2 = 1.872F$
$R_3 = .2125F$
$R_4 = .405F$
$R_5 = .171F$
$R_6 = -.1837F$
$R_7 = -.608F$
$R_8 = -.221F$
$R_9 = 3.190F$
$R_{10} = -.704F$
$t_1 = .02395F$
$t_2 = .06580F$
$t_3 = .02535F$
$t_4 = .02535F$
$t_5 = .0700F$
$t_6 = .0218F$
$S_1 = .00436F$
$S_2 = .1067F$
Diaphragm
$S_3 = .1067F$
$S_4 = .00109F$
$n_D (I) = n_D (II) = n_D (V) = n_D (VI) = 1.517$
$n_D (III) = n_D (IV) = 1.573$
$\nu (I) = \nu (II) = \nu (V) = \nu (VI) = 64.5$
$\nu (III) = \nu (IV) = 42.5$ 4. An optical system according to claim 3 further characterized by an anti-reflectance coat formed on all of the air-glass surfaces thereof, said coat having a maximum light transmission at a wavelength of substantially 460 millimicrons.

5. An optical system of the Gauss type for a projection objective working at low magnification, said system having a relative aperture as large as $f/4.5$ for infinity and being well corrected for color aberration for the transmission of radiant energy in the wavelength range from 3400 A. to 4400 A. as well as being diffraction limited in performance, said system consisting of a front singlet meniscus lens member, a singlet double convex member most rearwardly, and a pair of substantially symmetrical compound convex-concave lens members optically aligned between said front and rear members, the concave surfaces of the compound members enclosing a diaphragm centrally therebetween, the compound members each having a positive meniscus lens element and a negative meniscus lens element in contact therewith and nearest to said diaphragm, the radii $R_1$ to $R_{10}$ of the successive lens surfaces on the lens elements I to VI, the successive lens thicknesses $t_1$ to $t_6$, the lens spacings $S_1$ to $S_4$ and the refractive indices $n_D$ and Abbe numbers $\nu$ having values substantially as given in the table herebelow;

[E.F.L.=229.3. $f/4.5$ at infin. F.F.=154.6. B.F.=173.5]

| Lens | Radius | Thickness | Spaces | $n_D$ | $\nu$ |
|---|---|---|---|---|---|
| I | $R_1 = 118.03$ | $t_1 = 5.50$ | | 1.517 | 64.5 |
| | $R_2 = 428.55$ | | $S_1 = 1.00$ | | |
| II | $R_3 = 48.753$ | $t_2 = 15.09$ | | 1.517 | 64.5 |
| | $R_4 = 92.897$ | | | | |
| III | $R_5 = 39.084$ | $t_3 = 5.81$ | | | |
| | $R_6 = -42.073$ | | $S_2 = 24.50$ Diaphragm $S_3 = 24.50$ | | |
| IV | $R_7 = -139.32$ | $t_4 = 5.81$ | | 1.573 | 42.5 |
| V | $R_8 = -50.798$ | $t_5 = 16.02$ | | 1.517 | 64.5 |
| | | | $S_4 = 0.25$ | | |
| VI | $R_9 = 731.14$ | $t_6 = 5.00$ | | 1.517 | 64.5 |
| | $R_{10} = -161.44$ | | | | |

References Cited in the file of this patent
UNITED STATES PATENTS 2,682,198    Aklin    June 29, 1954
2,936,675    Schade    May 17, 1960
3,043,193    Lange et al.    July 10, 1962

UNITED STATES PATENT OFFICE
CERTIFICATE OF CORRECTION

Patent No. 3,145,255 August 18, 1964

Michael J. Buzawa

It is hereby certified that error appears in the above numbered patent requiring correction and that the said Letters Patent should read as corrected below.

Column 2, line 40, for "$S_4 < .0018F$" read -- $S_4 < .00118F$ --; column 4, in the table, under the heading "Thickness", line 5 thereof, for "$t_5 16.02$" read -- $t_5 = 16.02$ --.

Signed and sealed this 29th day of December 1964.

(SEAL)
Attest:

ERNEST W. SWIDER
Attesting Officer

EDWARD J. BRENNER
Commissioner of Patents